United States Patent
Petzold et al.

(10) Patent No.: US 6,745,123 B1
(45) Date of Patent: Jun. 1, 2004

(54) METHOD AND DEVICE FOR TRANSMITTING NAVIGATION INFORMATION FROM DATA PROCESSING CENTER TO AN ON-BOARD NAVIGATION SYSTEM

(75) Inventors: Bernd Petzold, Wunstorf (DE); Cornelius Hahlweg, Hildesheim (DE); Gerd Draeger, Braunschweig (DE); Ulrich Kersken, Diekholzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 10/030,554

(22) PCT Filed: Jun. 30, 2000

(86) PCT No.: PCT/DE00/02140

§ 371 (c)(1),
(2), (4) Date: May 17, 2002

(87) PCT Pub. No.: WO01/02806

PCT Pub. Date: Jan. 11, 2001

(30) Foreign Application Priority Data

Jul. 3, 1999 (DE) .......................................... 199 30 796

(51) Int. Cl.$^7$ ............................................... G01C 21/36

(52) U.S. Cl. ........................ 701/200; 701/24; 701/207; 701/208; 340/988; 340/993; 340/995.1

(58) Field of Search ............................. 701/24, 25, 200, 701/207, 208, 212, 214; 340/988, 989, 993, 995, 995.1

(56) References Cited

U.S. PATENT DOCUMENTS

| 5,915,001 A | * | 6/1999 | Uppaluru ................. 379/88.02 |
| 6,028,553 A |   | 2/2000 | Oberstien ................... 342/457 |
| 6,249,740 B1 | * | 6/2001 | Ito et al. ..................... 701/200 |
| 6,400,806 B1 | * | 6/2002 | Uppaluru ................. 379/88.02 |

FOREIGN PATENT DOCUMENTS

| DE | 195 19 066 | 5/1966 |
| DE | 196 51 143 | 6/1998 |
| EP | 0 756 153 | 1/1997 |
| EP | 0 814 448 | 12/1997 |
| EP | 0 921 509 | 6/1999 |

* cited by examiner

Primary Examiner—Gertrude A. Jeanglaude
(74) Attorney, Agent, or Firm—Kenyon & Kenyon

(57) ABSTRACT

A method and a device for transmitting navigation information from a data processing center to an on-board navigation system. The device includes a request profile generating device for generating an individual request profile according to the navigation information required by the on-board navigation system, a communication device for transmitting the individual request profile from the navigation system to the data processing center via a wireless interface, a preparation device provided in the data processing center for analyzing the transmitted individual request profile and preparing the navigation information required in the on-board navigation system and transmitting back the required navigation information from the data processing center to the on-board navigation system via the wireless interface, and a navigation information integrating device for integrating the back-transmitted, required navigation information into the on-board navigation system.

11 Claims, 3 Drawing Sheets

METHOD AND DEVICE FOR TRANSMITTING NAVIGATION INFORMATION FROM DATA PROCESSING CENTER TO AN ON-BOARD NAVIGATION SYSTEM

FIELD OF THE INVENTION

The present invention relates to a method and a device for transmitting navigation information from a data processing center to an on-board navigation system.

Although it may be used for any desired navigation system, the present invention and various objectives are explained below with reference to a navigation system on board an automobile.

BACKGROUND INFORMATION

Today's navigation systems may include the following subsystems: digital road map, computing module for travel route computation, positioning device, system management, vehicle sensor system for detecting vehicle movements, input unit and output unit for operation and/or route guidance.

The digital road map may be carried along in the navigation system on mass storage media, e.g., CD-ROMs. The digital road map may contain road networks with different coverages (e.g., Germany only) or also with different degrees of detail (e.g., highway road map and urban street network of certain regions). Furthermore, additional information to the road map, such as hotel or restaurant information for travel guides, etc., may be stored on the storage medium.

Due to the frequent changes in the road network or the additional information, or due to the more detailed or additional information acquired by the map manufacturer, the user may need to constantly update his/her digital map in order to keep up-to-date.

At the time of updating, the entire storage medium may be replaced, so that a large amount of data on the storage medium may result in an increased frequency of change and therefore higher update costs may be incurred for the user. Data seldom or never used by the user may also be updated and may be paid for proportionally. This may be complicated and costly.

European Patent No. 0 814 448 concerns a method for a dynamic route recommendation supported by a data processing center. The terminal follows one of the routes defined by the data processing center despite having its own database.

SUMMARY OF THE INVENTION

The exemplary method and/or exemplary embodiment according to the present invention may reduce the updates of the storage device (e.g., CD-ROM) of the entire database. Current data may be requested and transmitted as needed. The user may define his/her own individual navigation database and may agree upon individual update cycles and the extent thereof with the data processing center(s). The user may be offered up-to-the-minute map sections containing additional information, which may differ by region (e.g., via regional data processing centers, the regional hotel guide, parking services, general urban information, road closings, construction, etc.) by a number of associated data processing centers which possess different information contents. By coupling traffic management systems to data processing centers, the traffic may be directed by providing the map sections with attributes for travel recommendations or with traffic network areas to be avoided or omitting certain traffic network areas.

In an exemplary embodiment and/or exemplary method of the present invention, only the necessary data, e.g., the data defined by an individual request profile, may be automatically updated via a wireless interface (e.g., GSM, DAB or the like).

Automatic data transmission may provide the user, via the wireless interface, with at least a map section containing the map content and additional information individually desired or minimally needed by the user or the navigation system e.g., in the case of map transmission to the navigation system using the individual request profile (e.g., as a function of the destination and the planned travel route, etc.).

The data may be made available via the data processing center, in which up-to-the-minute map content and additional information may be stored.

Furthermore, additional information to an individual map section, updated within a specified time period, may be transmitted, for example, after the transmission of this map section.

The request profile may be transmitted using a bidirectional communication system (e.g., GSM, DAB+GSM, UMTS) as a query to a data processing center. An appropriate section of the navigation information, e.g., the digital map, may be extracted from the full database in the data processing center using the request profile of the incoming query.

The map section and the dynamic additional information may be expediently prepared so that they may be used in the receiving database of the navigation system for dynamic route search, route guidance and display without conversion. In this context, a data format desired by the navigation system may be transmitted to the data processing center, since in this way different navigation systems operating with different data formats may access the same data processing center. In addition, information may be requested by a navigation system from different data processing centers also operating with different data formats. As an alternative, the data may be prepared in a valid data format for digital maps and/or additional information to these maps, which the receiver may convert in order to use it for dynamic route search, route guidance and display.

The on-board navigation system may be implemented independently and may call the data from a data processing center automatically only as needed. The data may remain in the navigation system, e.g., may be stored there and may be used multiple times for different destinations.

Route computation may take place in the vehicle, rather than in the data processing center. The data processing center may represent only a database for road information, current traffic information, travel-relevant additional information to the map elements (e.g., occupancy figures for parking garages, detailed information concerning points of interest, including approach description, area-related information, etc.). The data processing center may filter out only the required data from the database using a request containing certain query parameters and may make it available to the navigation system. A request profile, e.g., the request, including its timing, may be determined by the on-board navigation system. The data processing center may be activated by the vehicle and therefore it may not be aware of the current position of the vehicle. The device may allow user-specific updates for example. The device may also contact a plurality of different data processing centers (simultaneously), for example, via a mobile Internet access and evaluate the data provided by the data processing center in the vehicle for the on-board route computation. The transmitted data may also contain intermodal partial routes (e.g., in the case of "park & ride," the routes in the public transportation system), which may also be evaluated in the vehicle.

According to an exemplary embodiment, the navigation system may have a data storage device for storing a navigation information database. A back-transmitted navigation information may be stored in the data storage device replacing the respective navigation information already stored in the navigation information database in order to update and/or supplement the database.

According to another exemplary embodiment, up-to-the-minute map content and additional information may be held in the data processing center as navigation information.

According to another exemplary embodiment, the individual request profile may have at least one of the following features:

- a driver's behavior, for example, average speed or the like;
- a current traffic situation;
- a current position;
- a travel destination;
- a planned travel route;
- a optimization criteria for the route search;
- exclusion of certain road classes or additional information;
- desired additional information;
- desired update frequency for time-variable additional information;
- data format of the database used in the navigation system;
- geographic area description of the desired map section; and
- segments contained in the desired map section, which may partially delimit or encircle the map section.

According to another exemplary embodiment, communication may be conducted with a plurality of data processing centers.

DETAILED DESCRIPTION

In the figures, the same reference symbols denote the same or comparable components.

Figure 1:
FIG. 1 shows a system for transmission of navigation information according to an exemplary embodiment of the present invention.

FIG. 1 shows an overall system for transmission of navigation information according to one embodiment of the present invention.

The overall system for transmission of navigation information, e.g. for transmission of maps and additional information, may have one (or more) data processing center(s) 2000, a communication system 1000, and an on-board navigation system 3000 for transmission control, preparation and use of map sections.

Figure 2:
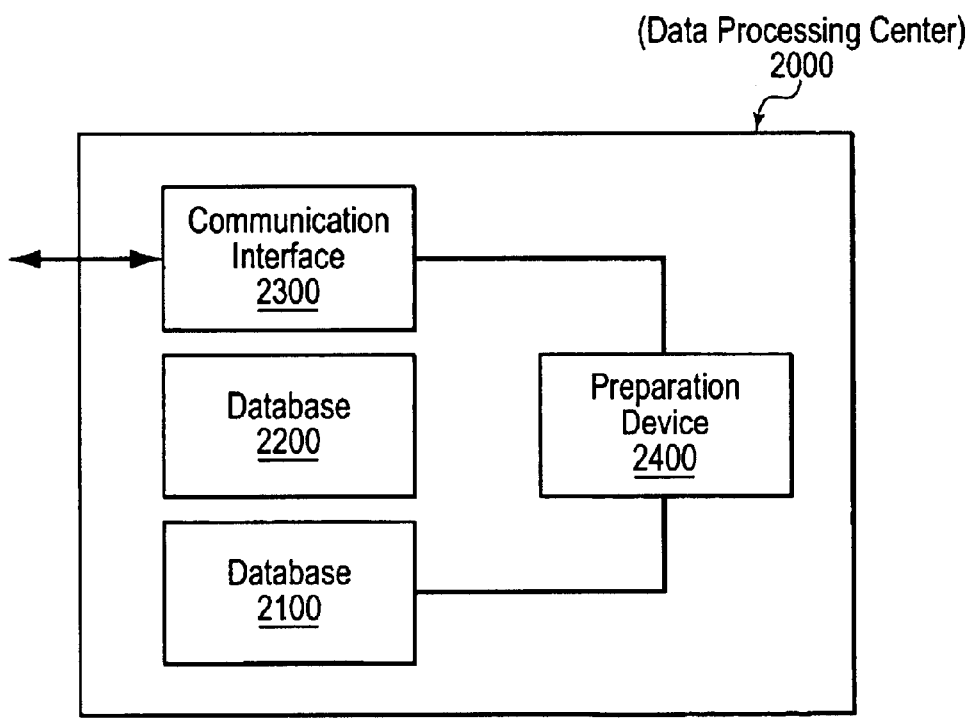
FIG. 2 shows a data processing center according to the embodiment of FIG. 1.

FIG. 2 shows a data processing center according to the embodiment of FIG. 1.

Data processing center 2000 may include in this embodiment a database 2100 for traffic networks, e.g., digital maps, and a database 2200 for additional information 2200, which may contain static and dynamic data.

The navigation information to be transmitted may be prepared in preparation device 2400 using a request profile transmitted by navigation system 3000 via communication system 1000; in this case, it may be prepared for a map section containing the map content desired by the user.

Data processing center 2000 may also be capable of communicating with other data processing centers via communication interface 2300 in order to provide the information desired by navigation system 3000 and which may not be contained in databases 2100 or 2200 or may not be up-to-date.

Figure 3:
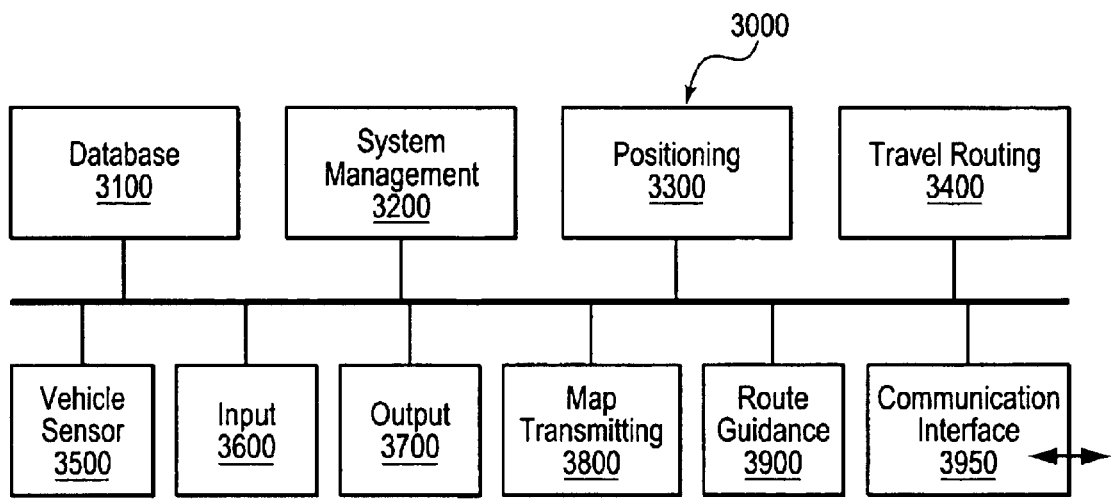
FIG. 3 shows an on-board navigation system according to the embodiment of FIG. 1.

FIG. 3 shows an on-board navigation system 3000 according to the embodiment of FIG. 1. A bus 3001, a database for digital maps 3100, a system management device 3200, a positioning device 3300, a travel routing device 3400, a vehicle sensor system 3500, an input unit 3600, an output unit 3700, a map transmitting device 3800, a route guidance device 3900, and a communication interface 3950 are shown.

Figure 4:
FIG. 4 shows a navigation system having an external fixed subsystem according to the embodiment of FIG. 1.

FIG. 4 shows a navigation system having an external fixed subsystem according to the embodiment of FIG. 1.

FIG. 4 describes a navigation system having the same function as that of FIG. 3, in which at least one of the subunits of FIG. 3 may be arranged in fixed subsystem 6000 and communication with mobile subsystem 4000, i.e., with the subunits arranged in the vehicle, may take place via communication system 5000. Communication systems 1000 of FIG. 1 and 5000 of FIG. 4 may be identical.

Figure 5:
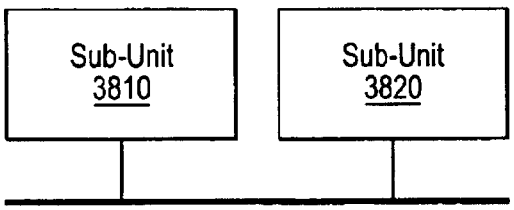
FIG. 5 shows a navigation information transmission device according to the embodiment of FIG. 1.

FIG. 5 shows a navigation information transmission device according to the embodiment of FIG. 1.

In FIG. 5, navigation information transmission device 3800 contains subunits 3810 for generating a user-specific or need-specific request profile and subunit 3820 for integrating the navigation information received, here for example the map section, into digital map 3100 in navigation system 3000.

Figure 6:
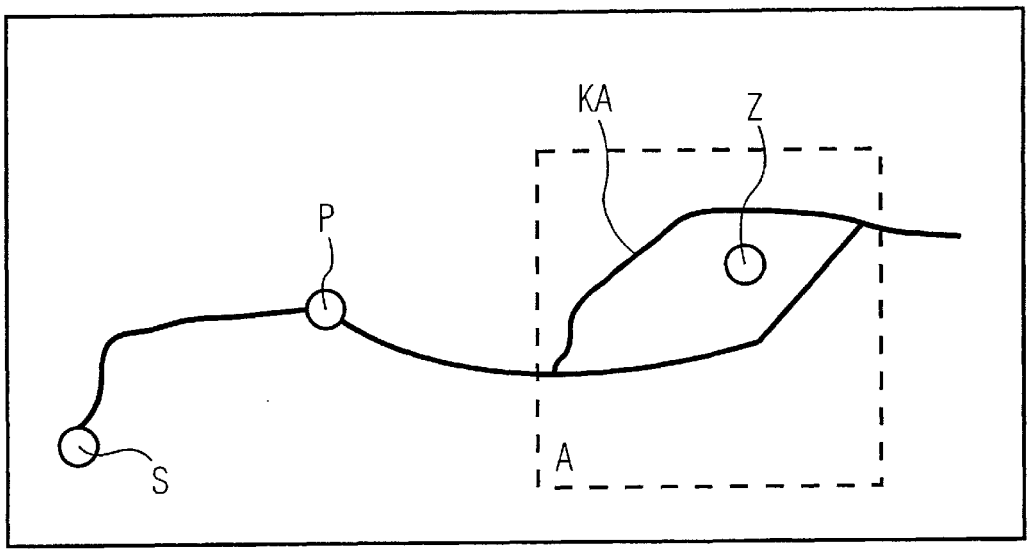
FIG. 6 shows an example of a situation prior to a navigation information transmission.
Figure 7:
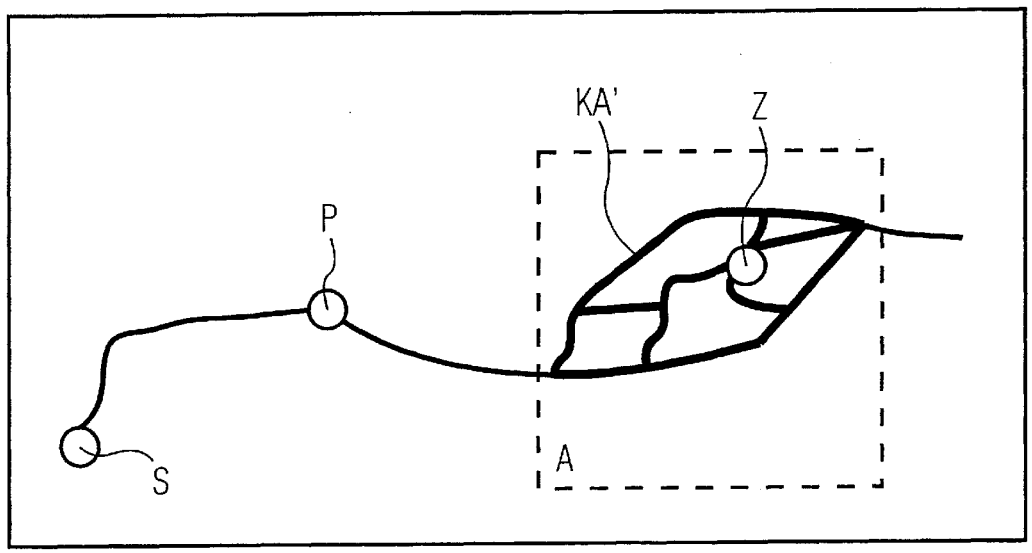
FIG. 7 shows an example of a situation after a navigation information transmission.

In order to elucidate an exemplary embodiment and/or exemplary method according to the present invention, FIG. 6 shows an example of a situation prior to a navigation information transmission and FIG. 7 shows an example of a situation after a navigation information transmission.

A user, whose vehicle is equipped with navigation system 3000 according to FIG. 2, undertakes a trip from start location S to destination Z and is located in current position P according to FIG. 6.

Destination Z is located in city A; however, navigation database 3100 in navigation system 3000 may contain only the supraregional road network and the central point of city A in the destination area.

When the destination is input, navigation system 3000 may recognize that destination Z of the trip is in a region not digitized in navigation database 3100, and therefore route guidance with exit information in the destination area may not be provided.

Therefore, navigation system 3000 may generate a request profile for a need-specific map section, using unit 3810 and predefined parameters such as driver's behavior (e.g., average speed), current traffic situation, current position, travel destination, planned travel route (e.g., along specific points of interest), optimization criteria for the route search (e.g., quickest or shortest route), exclusion of specific road classes or additional information, desired additional information (e.g., trip-specific information, points of interest, etc.), desired update frequency for time-variable additional information, data format of the database used in the navigation system, geographic area description of the desired map section (e.g., via parametrizable geometries such as polygons, circles, etc.), and segments (e.g., specific roads) contained in the desired map section, which may partially delimit or encircle the map section.

In this case, the request profile may define a subnetwork of city A with the current traffic situation, as well as the parking garages located near destination Z. Furthermore, it may be defined that the dynamic data in the map section may be updated in specific cycles which may be determined by the distance to the destination. The request profile may be transmitted to data processing center 2000 (service provider) via communication system 1000 (e.g., GSM).

Using the request profile, data processing center 2000 may generate, via preparation device 2400, a map section according to FIG. 7 containing the current traffic situation, the parking garages with current occupancy data near destination Z, as well as prediction data for the traffic situation in the destination area and the occupancy data at the user's estimated time of arrival at destination Z. The data may be converted into the data format desired by navigation system 3000 and transmitted there using communication system 1000.

In the communication system, navigation information integrating device 3820 may convert the received data and may integrate it into a navigation database, e.g., digital map 3100 according to FIG. 7.

Subsequently, using devices 3200 through 3500, the travel route on updated digital map 3100 may be recomputed. Data processing center 2000 may transmit the updated data related to the map section to receiver 3000 within the cycle defined in the request profile.

As an alternative, navigation system 3000, having request profile generating device 3810, may also request cyclically updated data, which may have been labeled "time-variable" when the respective map section was first transmitted, from data processing center 2000.

Although the present invention was explained above with reference to a preferred exemplary embodiment, it is not limited thereto, but may be modified in multiple ways.

For example, a CD-ROM of a highway network may be used as navigation database 3100 for the digital map and additional information. However, other overwritable mass storage media may also be used.

The exemplary embodiment and/or exemplary method of the present invention are not intended to be limited to the above-described navigation data or GSM wireless interface.

What is claimed is:

1. A method of transmitting and receiving navigation information between a data processing center and an on-board navigation system, the method comprising:
    receiving an individual request profile transmitted from the on-board navigation system to the data processing center via a wireless interface;
    analyzing the transmitted individual request profile in the data processing center; and
    transmitting the navigation information from the data processing center to the on-board navigation system via the wireless interface taking into account a result of the analysis;
    wherein a data format of a database used in the on-board navigation system is transmitted, and the navigation information is transmitted from the data processing center to the on-board navigation system in the data format.

2. The method of claim 1, wherein the on-board navigation system includes a data storage device to store a navigation information database, and back-transmitted navigation information is stored in the data storage device to replace respective navigation information already stored in the database to at least one of update and supplement the database.

3. The method of claim 1, wherein at least one of an up-to-the-minute map content and additional information are held in the data processing center as the navigation information.

4. The method of claim 1, wherein the individual request profile includes at least one of:
    a driver's behavior,
    a current traffic situation,
    a planned travel route,
    optimization criteria for a route search,
    at least one of an exclusion of a certain road class and additional information,
    a desired update frequency for time-variable additional information, the data format of the database of the navigation system,
    a geographic area description of a desired map section, and
    segments contained in the desired map section at least one of partially delimiting and encircling the desired map section.

5. The method of claim 4, wherein the driver's behavior includes an average speed.

6. The method of claim 1, wherein communication is conducted with a plurality of data processing centers.

7. A device for transmitting navigation information between an on-board navigation system and a data processing center, the device comprising:
    a request profile generating device to generate an individual request profile according to the navigation information required in the on-board navigation system;
    a communication device to transmit the individual request profile from the on-board navigation system to the data processing center via a wireless interface; and
    a navigation information integrating device to integrate back-transmitted, required navigation information into the on-board navigation system;
    wherein the data processing center includes a preparation device to analyze a transmitted individual request profile and to prepare the navigation information required in the on-board navigation system, and to transmit back required navigation information from the data processing center to the on-board navigation system via the wireless interface; and
    wherein a data format of a database used in the navigation system is transmitted to the data processing center, and the navigation information is converted by the preparation device into the data format of the database used in the navigation system and transmitted in the data format to the navigation system.

8. The device of claim 7, wherein the on-board navigation system includes an over-writeable mass storage medium to store the navigation information.

9. The device of claim 7, wherein map content and additional information can be called in a respective database of the data processing center as navigation information.

10. The device of claim 7, wherein the individual request profile includes at least one of a driver's behavior, a current traffic situation, a planned travel route, optimization criteria for a route search, at least one of an exclusion of a certain road class and additional information, a desired update frequency for time-variable additional information, the data format of the database used in the navigation system, a geographic area description of a desired map section, and segments contained in the desired map section at least one of partially delimiting and encircling the map section.

11. The device of claim 10, wherein the driver's behavior includes an average speed.

* * * * *